United States Patent [19]
Dell'olmo

[11] Patent Number: 5,873,305
[45] Date of Patent: Feb. 23, 1999

[54] METHOD FOR PROTECTING FROM FORGERY, ASSURING THE AUTHENTICITY OF OR PERSONALIZING PRE-PRINTED SHEETS

[75] Inventor: Giancarlo Dell'olmo, Milan, Italy

[73] Assignee: Oranmay Investments B. V., Amsterdam, Netherlands

[21] Appl. No.: 836,169
[22] PCT Filed: Nov. 14, 1995
[86] PCT No.: PCT/IT95/00185
  § 371 Date: May 6, 1997
  § 102(e) Date: May 6, 1997
[87] PCT Pub. No.: WO96/14994
  PCT Pub. Date: May 23, 1996

[30] Foreign Application Priority Data

Nov. 14, 1994  [IT]  Italy ................................ MI94A2300

[51] Int. Cl.[6] ................................................. B31F 1/07
[52] U.S. Cl. ................................ 101/32; 283/72; 283/901
[58] Field of Search ................................ 101/25, 301, 4, 101/17, 32; 283/57, 58, 59, 902, 901, 72, 74, 93, 94

[56] References Cited

U.S. PATENT DOCUMENTS

| | | | |
|---|---|---|---|
| 4,135,962 | 1/1979 | Sinclair et al. | 156/287 |
| 4,152,389 | 5/1979 | Miller | 264/284 |
| 4,701,235 | 10/1987 | Mitsam | 156/233 |
| 4,725,111 | 2/1988 | Weitzen et al. | 350/3.85 |
| 5,142,383 | 8/1992 | Mallik | 359/2 |
| 5,208,089 | 5/1993 | Stover | 428/284 |

FOREIGN PATENT DOCUMENTS

| | | |
|---|---|---|
| WO89/03760 | 5/1989 | WIPO. |
| WO93/024332 | 12/1993 | WIPO. |

*Primary Examiner*—Edgar Burr
*Assistant Examiner*—Dave A Ghatt
*Attorney, Agent, or Firm*—Seidel, Gonda, Lavorgnia & Monaco, PC

[57] ABSTRACT

The method provides the protection or personalization of the pre-printed sheets by impressing microengravings, on all or some of the printed portions of the sheets, through an embossing process carried out on the pre-printed sheets at a temperature higher than the softening point of the dyeing substances used for obtaining the print thereon and followed by a cooling step, said microengravings corresponding to holograms or diffraction patterns or images or words.

8 Claims, 1 Drawing Sheet

5,873,305

METHOD FOR PROTECTING FROM FORGERY, ASSURING THE AUTHENTICITY OF OR PERSONALIZING PRE-PRINTED SHEETS

FIELD OF THE INVENTION

The present invention relates to a method for protecting from forgery, assuring the authenticity of or personalizing pre-printed sheets (both of small size such as documents, etc. and of large size such as continuous paper or strips wound in reels) and in particular pre-printed by laser or ink-jet printers, plotters, airbrushes, and xerographic, typographic, lithographic, off-set, serigraphic, flexographic, copper-plate, rotogravure machines with any kind of drying, including UV and electron-beam reticulation.

BACKGROUND OF THE INVENTION

Various methods are used in order to protect from forgery or to assure the authenticity of printed documents.

The use of watermarked paper and the impressing of holograms are among those methods which offer a greater guarantee. These are two fairly expensive methods either, in the case of watermarked paper, for the costs involved in the paper manufacturing process, or, in the second case, for the costs of preparation of the type plate (electrotype) and even more of the paper substrate in that said substrate is usually previously coated with a film of a material (such as PVC, polyester, polypropylene, polythene, coating, etc.) suitable to receive and permanently retain the holographic microengravings engraved by the electrotype. Moreover, in the case of holograms the manufacturing costs are economically sustainable only for mass productions (generally using substrate material in reels) whose plant require high investments.

For example, WO-A-89/03760 discloses a method for impressing holograms on a paper or plastic sheeting by providing a coating thereon and then embossing the coated substrate. The coating can be applied in different ways according to the thermoplastic material employed in the process (e.g. polyethylene by extrusion). Regardless of the specific process, this coating step of covering the whole surface of the sheet with a uniform coating layer implies the above-mentioned problems.

SUMMARY OF THE INVENTION

The present invention is aimed at overcoming these drawbacks and limitations by providing a method for protecting from forgery, assuring the authenticity of or personalizing pre-printed sheets, which has a significantly low cost and is suitable not only for mass production applications but also and particularly for small productions.

To this purpose, the method according to the invention provides the protection or personalization of the pre-printed sheet by impressing microengravings, on all or some of the printed portions of the sheet, said microengravings corresponding to holograms or diffraction patterns or images or words and being obtained through a hot embossing process, carried out at a temperature higher than the softening point of the dyeing substances used for obtaining the print on the pre-printed sheet.

The features of the invention will be apparent from the following description of a non-limiting embodiment schematically illustrated in FIG. 1.

According to the method of this example, once the type and content of the microengraving to be transferred on the pre-printed sheets have been selected (e.g. the microengraving of an hologram showing a specific figure or producing a particular visual effect), a type plate of the hologram is prepared according to the processes conventionally used for the embossing of holograms, said plate usually consisting of a flexible metallic sheet having the microengraving of the hologram and designed to be applied onto that of the two cylinders of an embossing group which is usually called "embossing cylinder".

Assuming that the treatment is to be applied to pre-printed sheets of small size and not in reels (this latter case being particularly simple as it will be said further on), the sheets have to be subjected to an embossing process by using said plate.

Figure 1:
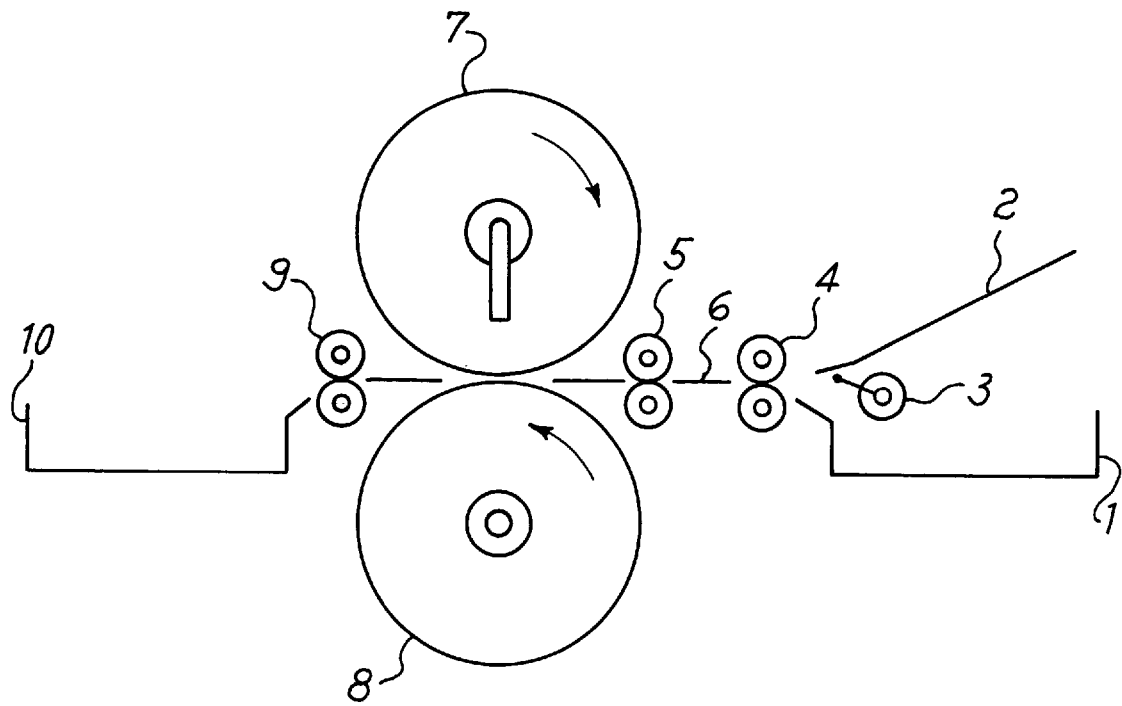
FIG. 1 illustrates in a highly schematic way the members of a machine which can be used to said purpose. The meaning of the various elements therein is the following.

1: holding tray for the pre-printed sheets to be subjected to embossing, when it is desired to feed the machine in an automatic way.
2: plane for single sheet feed (manual feed).
3: roller for picking the sheet from the tray.
4 and 5: sheet feed rollers.
6: feed plane or belt.
7 and 8: embossing group wherein 7 is the embossing cylinder and 8 is the impression (or pressure) cylinder.
9: rollers for cooling the sheet coming out from the embossing group.
10: collecting tray for the outcoming sheets.

DESCRIPTION OF THE PREFERRED EMBODIMENTS

Obviously, a conventional sheet feeder and sheet collector may replace, respectively, the holding tray 1 and the collecting tray 10. Cylinder 7 must have the characteristics usually required for embossing cylinders, namely it must be made from ground and lapped hardened steel of high surface resilience, with a very high degree of surface finish, such that the cylinder surface has a degree of linearity (i.e. of approximation of a straight line), along any generatrix of the cylindrical surface, which is not lower than the order of magnitude of the resolution of the microengravings on the plate. An acceptable value of said degree of linearity could be, for example, around 2000 lines per mm.

Cylinder 8 is made from hardened steel, preferably coated with a rubber layer having a Shore hardness of 75÷100, and is idle around its axis so that, when operating, it can be driven by the rotation of the upper cylinder 7. Its shaft is supported at its ends by two spring supports (cup-type springs) and exerts against cylinder 7 a pressure between 1 and 60 kg/mm$^2$, preferably around 20 kg/mm$^2$.

The type plate is secured onto the surface of cylinder 7 and is sized so as to cover substantially the whole thereof. Alternatively the cylinder itself could be engraved with the microengravings.

When operating, said cylinder is heated (e.g. by means of a fluid circulating therein or by means of an electrical resistor) at a temperature such as to assure that the paper of the document passing under the plate reaches a temperature a little higher (e.g. by 10° C.) than the softening temperature (e.g 80° C.) of the dyeing substances used for obtaining the print on the pre-printed sheet. Said temperature of the cylinder shall be selected according to the operating speed, in that higher operating speeds require higher cylinder temperature in order to achieve the same paper temperature. For a paper temperature of about 80° C. and an operating speed around 20 m/min, the cylinder temperature could be in the range of 120°–140° C.

For the correct working of the machine it is necessary that, at each embossing operation, the document picked from tray 1 is taken to the inlet to the embossing group and starts passing between the cylinders with a proper phase, i.e. at the moment when the plate leading edge is arriving at the area of contact between the cylinders. The mechanism for picking and feeding the sheets in phase with the plate leading edge can be made much alike similar mechanisms already used in other machines, such as for example the mechanism of a xerographic machine which assures the picking and phased feeding of the sheets to the light-sensitive drum of the machine.

It is apparent from the above how it is possible and takes place the transferring of the microengravings on the plate to the document in transit. In fact, since during the passage of the document between the cylinders the document reaches, in the contact area, the softening temperature of the dyeing substances, the plate can impress the microengravings on the film that said substance is forming on the paper, which microengravings will remain permanently retained on the pre-printed portions after the document has come out of the cylinders and has been substantially immediately cooled by the cooling group 9.

As an alternative, the paper could be heated by a heating group (e.g. by hot air, IR, heated rollers 5, etc.) prior to entering the embossing group, and the latter could also include the cooling by having cylinder 7 and 8 internally cooled (e.g. by water, air, oil, etc.). In this way, the cooling takes place almost simultaneously with the impressing of the microengravings, thus assuring an even better "freezing" thereof than by cooling rollers 9.

It can be understood that the above-described method is suitable both for large series and small series treatments. In the latter case the machine can have a reduced size and cost, comparable with those of an office machine (e.g. a xerographic machine) so that it can be a useful tool for industries, banks, offices, etc.

The previously mentioned advantages are apparent from the above. In fact:

the method assures the impossibility of counterfeiting a document treated therewith, both for the possibility of erasing and forging (which would necessarily cancel in the forged portion the microengravings and their visual effect) and of copying (presently known copying methods are not able to reproduce the microengravings); therefore, the method can be used, for example, for issuing uncounterfeitable cheques in a quite cheap and reliable way; in the same way, it can be used for assuring the originality of any document;

it can be used for personalizing in a very cheap way a wide range of documents such as headed paper, leaflets, coupons for various uses, shares, stocks, bank or government bonds, etc.

As already mentioned, the above-schematized embodiment has been described as a mere non-limiting example and many modifications, adaptations, additions, changes and replacements of members with other functionally equivalent ones can be made thereto yet without departing from the spirit of the invention and from the protecting scope of the appended claims.

A modification could concern the area of the plate which could be lower than that of the cylindrical surface of the embossing cylinder rather than being equal thereto.

Another modification could be the application of the method to a xerographic machine, by inserting the embossing group immediately downstream from the light-sensitive drum so that each document coming out from the photocopying machine is automatically protected from forgery and personalized. Similarly, the method could be applied in line with lithographic, rotogravure, or flexographic machines.

A further modification could be the application of the method to pre-printed sheets in reels. In this case the corresponding machine would have a configuration quite similar to that of current embossing machines.

I claim:

1. A method for protecting from forgery, assuring the authenticity of or personalizing sheets carrying a print which is printed thereon with inks containing dyeing substances during a first printing step, characterized in that the protection or personalization of the printed sheets is achieved through a second step only, during which second step the impression of microengravings, on all or some portions of the sheets, is achieved through an embossing process carried out on the printed sheets at a temperature higher than the softening point of the dyeing substances contained in the inks used for obtaining the print thereon and followed by a cooling step, said microengravings producing a selected one of holograms, diffraction patterns, images, words.

2. The method according to claim 1, wherein the embossing process includes the use of a heated embossing cylinder and a cooling group downstream therefrom.

3. The method according to claim 2, wherein the embossing cylinder is heated by means of a fluid circulating therein.

4. The method according to claim 2, wherein the embossing cylinder is heated by means of an electric resistor.

5. The method according to claim 1, wherein the embossing process includes the use of a cooled embossing group and a sheet heating group upstream therefrom.

6. The method according to claim 5, wherein the embossing group is cooled by means of a fluid circulating therein.

7. The method according to claim 1, wherein the embossing process includes the use of an impression cylinder coated with a rubber layer having a Shore A hardness from 75 to 100.

8. The method according to claim 1, wherein the embossing group exerts on the sheets in transit a pressure between 3 and 60 kg/mm$^2$, preferably 20 kg/mm$^2$.

* * * * *